United States Patent [19]

Smith, III

[11] Patent Number: 5,390,702
[45] Date of Patent: * Feb. 21, 1995

[54] UNDERSEA HYDRAULIC COUPLING WITH PRE-SEALING GUIDANCE

[75] Inventor: Robert E. Smith, III, Missouri City, Tex.

[73] Assignee: National Coupling Company, Inc., Stafford, Tex.

[*] Notice: The portion of the term of this patent subsequent to Aug. 3, 2010 has been disclaimed.

[21] Appl. No.: 196,956

[22] Filed: Feb. 15, 1994

[51] Int. Cl.⁶ .............................................. F16L 37/28
[52] U.S. Cl. ........................... 137/614.04; 251/149.7; 285/108; 285/111; 285/917
[58] Field of Search .......................... 137/614.04, 614; 251/149.6, 149.7; 285/108, 111, 917

[56] References Cited

U.S. PATENT DOCUMENTS

| | | | |
|---|---|---|---|
| 4,709,726 | 12/1987 | Fitzgibbons | 137/614.04 |
| 4,832,080 | 5/1989 | Smith | 137/614.04 |
| 5,029,613 | 12/1991 | Smith | 137/614.04 |
| 5,099,882 | 3/1992 | Smith, III | 137/614.04 |
| 5,232,021 | 8/1993 | Smith | 137/614.04 |

Primary Examiner—Gerald A. Michalsky
Assistant Examiner—Kevin L. Lee
Attorney, Agent, or Firm—Arnold, White & Durkee

[57] ABSTRACT

An undersea hydraulic coupling having a male member with a stepped outer body is inserted into a female member having a bore with stepped internal cylindrical surface. The step in the male member defines first and second external cylindrical surfaces which are slidably received in the female member bore and in a sleeve member before the seals, which are retained by the sleeve member, engage the male member. Thus, the male member is more accurately positioned and guided into the seals, insuring greater seal reliability and longer seal life. The stepped surfaces also help prevent implosion of the seals due to sea pressure when the end of the male member comes out of the seals.

20 Claims, 2 Drawing Sheets

UNDERSEA HYDRAULIC COUPLING WITH PRE-SEALING GUIDANCE

BACKGROUND OF THE INVENTION

1. Field of the Invention

This invention relates, in general, to hydraulic couplings, and specifically to hydraulic couplings used in undersea drilling and production applications. More particularly, the invention involves an undersea hydraulic coupling having improved guidance of the coupling members prior to sealing between the male member and the female member of the coupling.

2. Description of the Related Art

Subsea hydraulic couplings are old in the art. The couplings generally consist of a male member and a female member with seals to seal the junction between the male and female members.

The female member generally has a cylindrical body with a relatively large diameter bore at one end and a relatively small diameter bore at the other. The small bore facilitates connections to hydraulic lines, while the large bore contains the seals and receives the male portion of the coupling. The male member includes a cylindrical portion at one end to facilitate connection to hydraulic lines. When the cylindrical portion of the male member is inserted into the large bore of the female member, according to various embodiments of the device, the seals either abut the end, or face, of the male member or engage the male member about its circumference. The hydraulic fluid is then free to flow through the female and male portions of the coupling, and seals prevent that flow from escaping about the joints in the coupling.

A check valve may be installed in the female member and also in the male member. Each check valve is open when the coupling is made up; however, each check valve closes when the coupling is broken so as to prevent fluid from leaking out of the system of which the coupling is a part.

In U.S. Pat. No. 4,694,859 to Robert E. Smith III, an undersea hydraulic coupling with a radial metal seal is disclosed. This coupling provides a reusable radial metal seal which engages the circumference of the probe when it is positioned within the female member body. The metal seal is held in place by a cylindrical body or retainer. The retainer prevents escape of the metal seal from the female member body. When the male and female portions of the coupling are parted under pressure, the retainer prevents the metal seal from blowing out through the bore of the female member. This coupling uses a pressure actuated metal c-ring seal. Among the advantages of this design are that it requires no pre-load mechanism, is tolerant to movement of the two halves of the coupling relative to one another, and allows greater tolerances between the couplings and the manifold plates. The retainer also may be used to preload the metal c-ring seal by urging it radially inwardly to engage the circumference of the male member. This is accomplished by positioning the seal on a shoulder within the female member bore, then locking the retainer against the seal.

In U.S. Pat. Nos. 4,832,080, 5,099,882 and 5,277,225 to Robert E. Smith III, undersea hydraulic couplings are shown having at least two radial metal seals for sealing between the male member and the female member receiving chamber. Pressure energized seals are shown which are configured to seal radially between the male and female members, and the couplings are pressure balanced for fluid communication through mating radial passages and the annular space between the members.

In U.S. Pat. Nos. 5,029,613 and 5,284,183 to Robert E. Smith III, undersea hydraulic couplings are shown having a sealing member with a metal lip projecting radially inwardly to form a radial metal to metal seal with the male member in response to fluid pressure in the coupling, and locking or retaining means for holding the seal against an internal shoulder in the female member. In the couplings of U.S. Pat. Nos. 5,029,613 and 5,284,183, the male member is preferably aligned and guided into the receiving chamber of the female member prior to sealing engagement of the radial metal seals with the male member or probe.

Improved guidance of the probe into the female member will help ensure higher seal reliability and longer seal life in undersea hydraulic couplings. Additionally, in couplings of the foregoing type, a vacuum sometimes occur during withdrawal of the male member from the receiving chamber or bore, because of high subsea pressures.

SUMMARY OF THE INVENTION

The present invention resides in a hydraulic coupling of the foregoing type including male and female members for fluid communication therebetween and valves for controlling fluid flow in each of the members. The present invention includes a male member or probe having a body with an external shoulder and a stepped external cylindrical surface, a female member with a stepped internal bore, with the stepped surfaces of the male member and female member dimensioned to slide together prior to engagement of a radial seal with the male member. Preferably, a pressure energized ring shaped metal seal is used to form the radial seal with the male member. The seal may be retained by a sleeve member having an internal bore dimensioned to receive the male member.

The present invention improves the guidance of the probe or male member into the female member bore by providing two sliding surfaces, with the seal positioned between the surfaces. A close fit of the male member to the corresponding surfaces in the female member provides improved guidance during insertion of the male member. This helps ensure higher seal reliability and longer seal life. The stepped surfaces engage before the male enters any of the seals or the poppet valves open.

The steps on the male member and the female member also allow sea pressure to bleed out or into the annulus between the members during insertion or withdrawal of the male member. As a result, the present invention helps prevent implosion of the seals due to sea pressure when the end of the male member clears the seal and sea pressure rushes into the annulus between the members. Thus, the present invention helps equalize pressure on the seals between the members.

DESCRIPTION OF THE PREFERRED EMBODIMENTS

Figure 1:
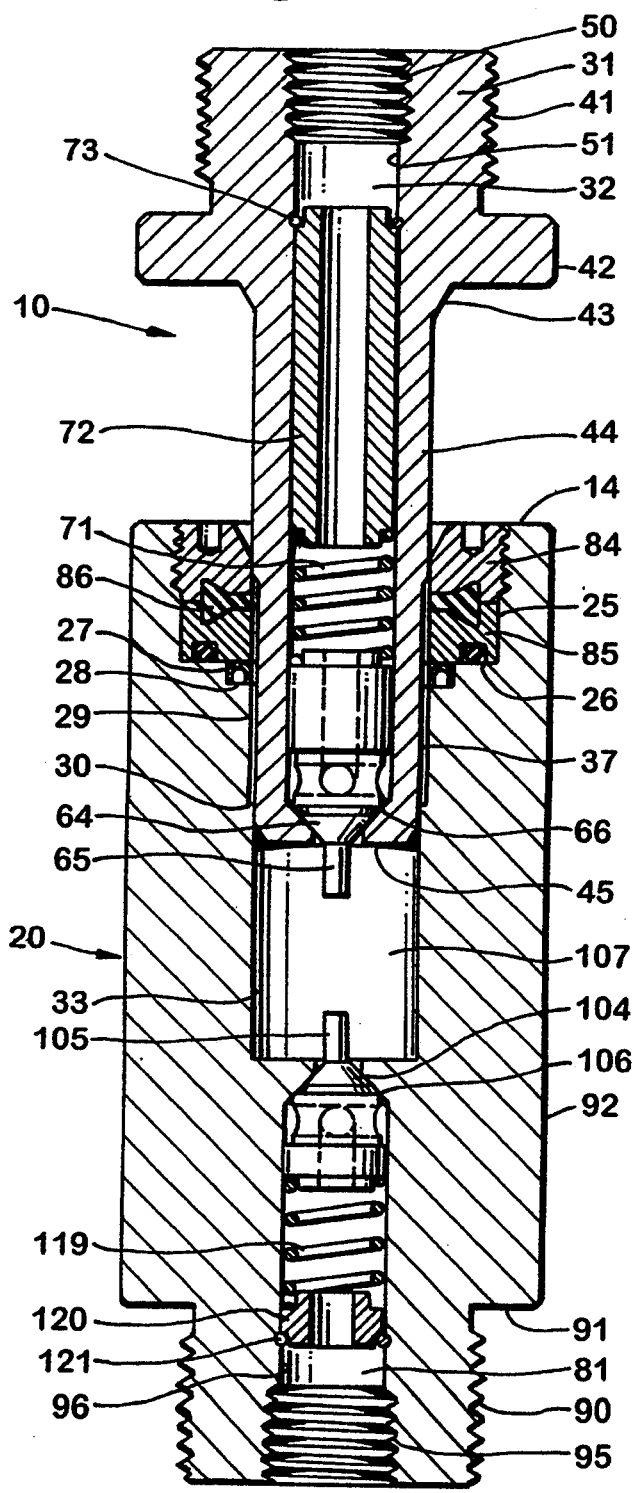
FIG. 1 is a sectional view of a preferred embodiment showing the male and female members of the coupling, with the male member partially inserted into the female member bore.

FIG. 1 is sectional view of the male member 10 and the female member 20 as the male member is partially inserted into the female member bore. The male member 10 is attached to a manifold plate with threads 41 or other means, such as set screws. The female member 20 is attached to a second manifold plate by threads 90 or other means. Techniques for attaching the members to such plates are well known to those skilled in the art.

Figure 2:
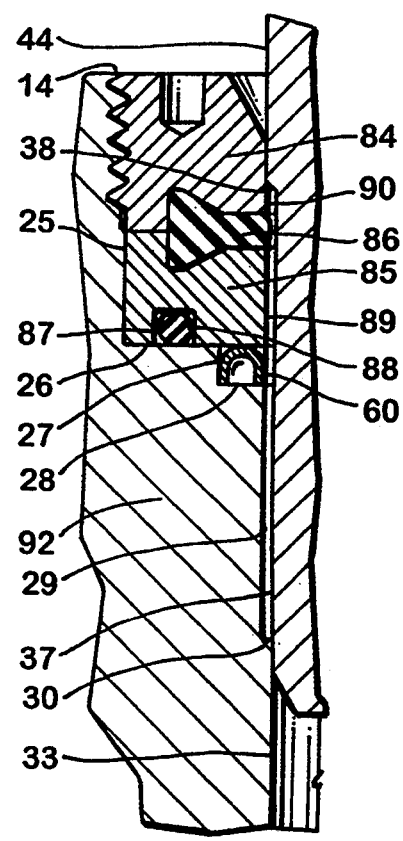
FIG. 2 is a sectional view of the stepped shoulder and seals shown in FIG. 1.

Male member 10 as shown in FIG. 1, comprises a probe handle 31, flange 42 and shoulder 43. The shoulder 43 is tapered down to the first external diameter 44 of the cylindrical probe wall, external shoulder 38 which provides a stepped reduction in the outer diameter, and second external diameter 37 of the probe wall which terminates at probe face 45. Preferably, the circumferential shoulder or step measure 10/1000 inch on radius. The shoulder or step may be at a right angle, or may be bevelled to form a positive angle as shown in FIG. 2. The male member probe wall at its first end 44 has a greater external diameter, and at its second end 37 has a narrower external diameter. The probe wall is dimensioned for sliding engagement with female member 20 and seal retainer 83, as will be discussed below.

The body of the male member also is provided with a central bore 32. The bore 32 may have several variations in its diameter as it extends through the body of the male member 10. In a preferred embodiment, the first end of the central bore comprises an internally threaded section 50 for connection to a hydraulic line. Adjacent and inboard of the threaded section is a cylindrical passageway 51 extending longitudinally within the male member body and terminating at valve seat 66 which is an inclined shoulder.

As shown in FIG. 1, the poppet valve assembly of the male member is slidably received within the central bore 32. The various parts of the poppet valve assembly are cylindrical hollow valve head 64 which has an outer diameter dimensioned to slide within the cylindrical bore 32. The valve head is conical in shape and dimensioned to seat on the valve seat 66 at the end of the male member bore. The valve head also has a stem 65 or actuator extending therefrom. Helical valve spring 71 is used to urge the valve 64 into a closed position against the valve seat 66. The helical valve spring 71 is located within the cylindrical bore 32 and anchored with spring collar 72 which is held in place by collar clip 73.

The female member 20 comprises a handle 90 which is optionally threaded to a manifold plate. Female member 20 also includes a shoulder 91 which is adjacent the handle 90 and the main cylindrical body 92. The central bore 81 has several variations in its diameter, as it extends longitudinally or axially through the body of the female member 20. At a first or outer end of the central bore 81 is a threaded internal passageway 95 for connection to a threaded hydraulic line. The threaded portion 95 of the central bore 81 terminates at cylindrical passageway 96 which slidably receives a poppet valve assembly. Cylindrical passageway 96 terminates at valve seat 106 for seating poppet valve 104. Inboard of the valve seat is a cylindrical receiving chamber 107. The receiving chamber slidably receives the probe or male member 10. As shown in FIG. 1, when the poppet valves are in contact with another, the valves are forced into open positions for fluid flow between the male and female members.

The valve assembly of the female member 20 comprises a poppet valve 104 which is slidably received within the cylindrical passageway 96 of the female member 20. The poppet valve 104 has a generally conical shape for seating at valve seat 106, and a stem 105 or actuator extending therefrom. To urge the valve into the closed position, helical valve spring 119 is mounted between the shoulder of the valve and spring collar 120 having collar clip 121 in the female member bore. The valves of the female member and of the male member are preferably identical in components and function.

In receiving chamber 107 of the female, there are several steps or circumferential shoulders, providing a series of internal diameters. As shown in FIG. 2, at first end 14 of the female member in a preferred embodiment, receiving chamber 107 engages a two-piece seal retainer 84, 85. The first piece 84 of the seal retainer may be threaded to the receiving chamber of the female member, or may be threaded to an external surface of the female member, outside the receiving chamber, if desired. Alternatively, the seal retainer may be engaged in a groove or slot in the receiving chamber, rather than threaded. The seal retainer may be dimensioned to fit into the receiving chamber at internal diameter 25 which may have the same diameter as internal diameter 27. In a preferred embodiment, diameter 25 is greater than diameter 27, with circumferential shoulder 26 therebetween. Shoulder 26 is not necessary, however, if internal diameter 27 extends all the way to the first end 14 of the female member. In a preferred embodiment, the seal retainer comprises a first piece 84, a second piece 85, each of these pieces providing a surface for dovetail interfit of elastomeric seal 86. Elastomeric seal 86, in a preferred embodiment, has a dovetail interfit between the two pieces of the seal retainer. The first piece 84 is threaded to the female member, while the second piece 85 has a sliding fit against internal diameter 25 of the female member receiving chamber. Also, in a preferred embodiment, the second piece 85 has a groove 87 dimensioned to seat o-ring 88, which is a ring shaped seal for sealing with shoulder 26.

The internal diameter 89, 90 of the two piece retainer 84, 85 is dimensioned to slidingly engage the largest external diameter 44 of the male member or probe. Preferably, there is a close fit between the diameter 44 of the male member or probe and the internal diameter 89, 90 of the seal retainer.

Diameter 27 and shoulder 28 in receiving chamber 107 are dimensioned to provide a seating surface for metal c-ring seal 60. Preferably, the metal c-ring seal has a cavity so the seal is responsive to fluid pressure in the coupling to expand radially outwardly against diameter 27. Diameter 29 is dimensioned to fit tightly with the cylindrical surface 44 of the male member or probe, and to allow sliding contact therewith. Preferably, internal diameter 29 and the internal diameter of the seal retainer provide a tight, sliding fit with the male member or probe's cylindrical surface 44.

Shoulder 30 provides another narrowing step in the receiving chamber and is preferably 10/1000 inches in radius. Cylindrical surface 33 is configured for a tight, sliding fit with surface 37 of the male member or probe.

Hollow metal seal 60 preferably is a c-shaped metal seal which is pressure energized to expand both radially inwardly against the male member probe wall 45 and radially outwardly against the receiving chamber at diameter 27. If desired, the metal seal may be dimensioned to have slight radial interference with either the receiving chamber at diameter 27 or with the probe wall at diameter 44. The metal seal is preferably made of a thin metal that is flexible to withstand repeated uses without fatigue. The seal may be readily obtained from metal seal manufacturers.

Figure 3:
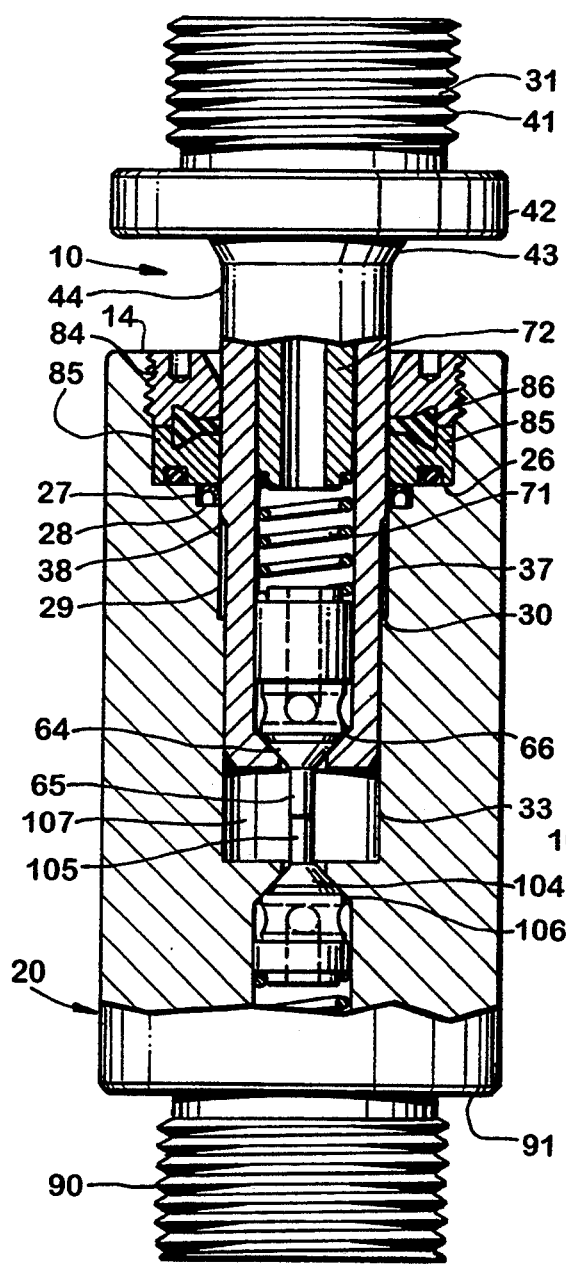
FIG. 3 is a sectional view of a preferred embodiment showing the male and female members, with the male member in sealing engagement with the seals in the female member.

Elastomeric seal 86 is also a ring shaped seal, preferably having a dovetail interfit with the seal retainer, as described above. As shown in FIG. 3, the internal diameter of seal 86 is dimensioned to engage surface 44 of the male member as it is inserted into the receiving chamber. As shown in FIG. 2, outer surface 44 of the male member and internal diameter 89, 90 of the two-piece seal retainer are in tight sliding engagement, while outer surface 37 of the male member and the internal diameter 33 of the female member receiving chamber also come into tight, sliding engagement, prior to engagement of either seal 86 or 60 with the male member or probe wall. Therefore, the stepped diameters allow sea pressure to bleed out or into the annulus between the members during partial engagement or withdrawal of the male member from the receiving chamber, as shown in FIG. 1 and 2. Also, the steps provide guidance of the male member into the receiving chamber before engaging the seals. The guidance is on two separate surface, on either side of the seals.

Figure 4:
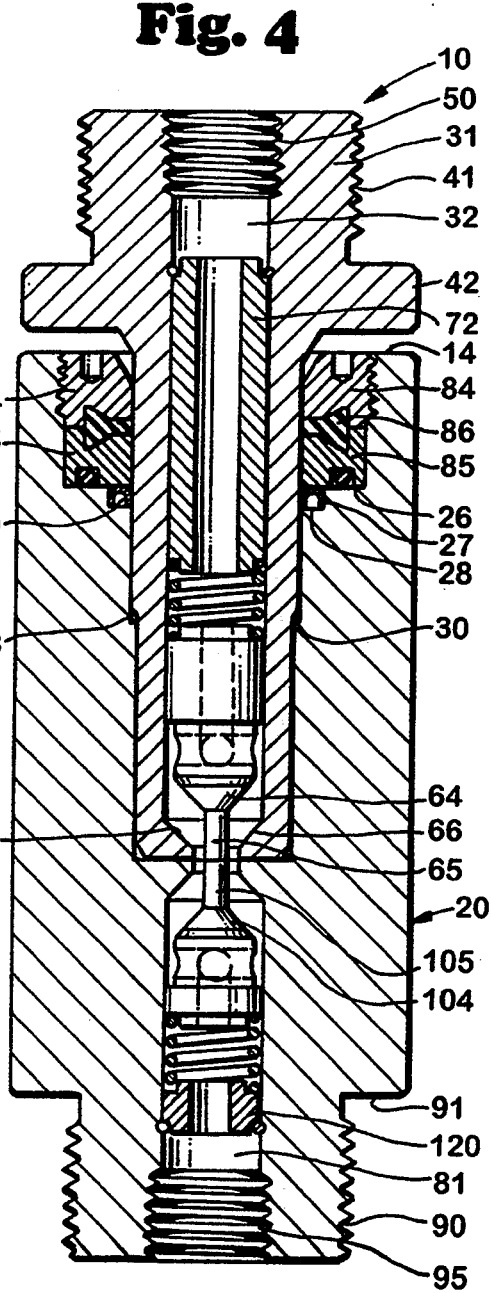
FIG. 4 is a sectional view of a preferred embodiment showing the male and female members of the coupling, with the male member fully inserted into the female bore.

As shown in FIG. 3, the valves in each member are biased closed until after the seals 60, 86 engage cylindrical section 44 of the male member or probe. Then, as shown in FIG. 4, the valves are urged open to allow fluid flow between the members. Although the particular seal arrangement described is preferred in the coupling of the present invention, other types of seals may be used without departing from the spirit of the invention. For example, seals other than those having a dovetail interfit with the seal retainer may be used in the present invention. Similarly, other pressure energized seals may be used. However, the seals should be reusable and retained in place upon separation of the male and female members of the coupling.

It will now be understood by those of skill in the art that an improved undersea hydraulic coupling may be made utilizing the present invention. Although variations in the embodiment of the present invention may not each realize all of the advantages of the invention, certain features may become more important than others in various applications of the device. The invention, accordingly, should be understood only to be limited only by the scope of the appended claims.

I claim:

1. An undersea hydraulic coupling, comprising:
   (a) a male member having a body with an external shoulder thereon to define first and second external cylindrical surfaces; the first external surface having a greater diameter than the second;
   (b) a female member having an internal bore with first and second internal shoulders to define first, second, and third internal cylindrical surfaces in the bore; the first internal surface in the bore having the greatest diameter and the third internal surface having the smallest diameter; the third internal surface in the bore dimensioned to slidably receive the second external surface of the male member and the second internal surface in the bore dimensioned to slidably receive the first external surface of the male member;
   (c) a ring-shaped seal insertable into the female member bore adjacent the first internal shoulder; the ring-shaped seal having an inner diameter dimensioned to seal radially with the first external surface of the male member;
   (d) a sleeve member engageable with the female member and having an internal bore dimensioned to slidably receive the first external surface of the male member; the first and second external surfaces of the male member being slidably received in the sleeve member bore and the third internal surface of the female member bore, respectively, before the first external surface of the male member comes into sealing engagement with the ring-shaped seal.

2. The undersea hydraulic coupling of claim 1 wherein the ring-shaped seal is a hollow metal seal.

3. The undersea hydraulic coupling of claim 1 wherein the ring-shaped seal is a C-shaped hollow metal seal that is responsive to fluid pressure in the coupling to expand radially inwardly to seal radially with the first external surface of the male member.

4. The undersea hydraulic coupling of claim 1 further comprising a second ring-shaped seal insertable into the female member bore and held in place by the sleeve member.

5. The undersea hydraulic coupling of claim 4 wherein the second ring-shaped seal is an elastomeric seal having a dovetail interfit with the sleeve member.

6. The undersea hydraulic coupling of claim 1 further comprising normally closed valves in the male member and the female member, the valves configured to be urged open after the first external surface of the male member comes into sealing engagement with the ring-shaped seal.

7. The undersea hydraulic coupling of claim 1 wherein the sleeve member is threaded to the female member.

8. The undersea hydraulic coupling of claim 1 wherein the sleeve member comprises a two-piece cylindrical body, one of the pieces being threaded to the female member.

9. An undersea hydraulic coupling, comprising:
   (a) a receiver having a first end, a second end, and a longitudinal bore extending therethrough, the bore having two circumferential shoulders therein to define outermost, intermediate, and innermost internal diameters, progressively narrower from the first end to the second end of the receiver;
   (b) a ring-shaped seal positioned on the shoulder in the receiver bore closest to the first end of the receiver;
   (c) a seal retainer engageable with the receiver for holding the seal on the shoulder; the seal retainer having a bore with an internal diameter substantially the same as the intermediate diameter of the receiver bore;
   (d) a probe member insertable into the receiver bore, the probe member having a first end, a second end, and an outer circumferential surface with a step thereon to define two external diameters progressively narrower from the first end to the second end of the probe member; the narrowest external diameter adapted to slidingly engage the innermost diameter of the receiver bore and the largest external diameter adapted to slidingly engage the internal diameter of the seal retainer bore before the ring-shaped seal engages the outer diameter of the probe member.

10. The undersea hydraulic coupling of claim 9 wherein the ring-shaped seal is a hollow, pressure-energized metal seal.

11. The undersea hydraulic coupling of claim 9 wherein the seal retainer is threaded to the receiver.

12. The undersea hydraulic coupling of claim 9 further comprising a second ring-shaped seal, and wherein the seal retainer is configured to hold the second seal in place upon separation of the probe from the receiver.

13. The undersea hydraulic coupling of claim 9 wherein the narrowest external diameter of the probe member is adapted to slidingly engage the innermost diameter of the receiver bore and the largest external diameter is adapted to slidingly engage the internal diameter of the seal retainer bore before the second ring-shaped seal engages the outer diameter of the probe member.

14. The undersea hydraulic coupling of claim 9 wherein the circumferential shoulder closest to the second end of the receiver bore, and the step on the outer circumferential surface of the male member, are dimensioned to define an annulus between the probe and receiver when the probe is partially inserted into the receiver bore.

15. The undersea hydraulic coupling of claim 9 further comprising valves in the probe and receiver, the valves biased to closed positions until after the ring-shaped seal has engaged the outer diameter of the probe member.

16. An undersea hydraulic coupling, comprising:

(a) a female member with an internal bore, a valve slidable in the internal bore to control fluid flow therethrough, and a receiving chamber having a first diameter, a first circumferential shoulder, a second diameter narrower than the first diameter, a second circumferential shoulder, and a third diameter narrower than the second diameter;

(b) a sleeve-like sealing member engageable with the female member and having an internal bore extending therethrough;

(c) a male member insertable into the receiving chamber, having an internal bore, a valve slidable in the internal bore to control fluid flow therethrough, and having an outer body with a first diameter, a first circumferential shoulder, and a second diameter smaller than the first; the first diameter of the male member dimensioned to slide into the bore of the sleeve-like sealing member and the second diameter of the male member dimensioned to slide into the third diameter of the receiving chamber prior to sealing engagement between the sealing member and the male member.

17. The undersea hydraulic coupling of claim 16 wherein the sealing member comprises a two piece sleeve with a ring-shaped seal held between the two pieces.

18. The undersea hydraulic coupling of claim 16 wherein the sealing member comprises a hollow metal seal and a retainer for holding the seal in the receiving chamber.

19. The undersea hydraulic coupling of claim 16 wherein the sealing member is threaded to the receiving chamber.

20. The undersea hydraulic coupling of claim 17 wherein the ring-shaped seal has a dovetail interfit between the two piece sleeve.

* * * * *